US009172454B2

(12) United States Patent
Harel et al.

(10) Patent No.: US 9,172,454 B2
(45) Date of Patent: Oct. 27, 2015

(54) METHOD AND SYSTEM FOR CALIBRATING A TRANSCEIVER ARRAY

(71) Applicant: Magnolia Broadband Inc., Englewood, NJ (US)

(72) Inventors: Haim Harel, New York, NY (US); Phil F. Chen, Denville, NJ (US); Kenneth F. Kludt, San Jose, CA (US); Thorp Rivingston, Long Branch, NJ (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/505,655

(22) Filed: Oct. 3, 2014

(65) Prior Publication Data

US 2015/0124634 A1   May 7, 2015

Related U.S. Application Data

(60) Provisional application No. 61/898,802, filed on Nov. 1, 2013.

(51) Int. Cl.
*G06F 11/00*   (2006.01)
*H04L 1/00*   (2006.01)
(Continued)

(52) U.S. Cl.
CPC ............... *H04B 7/0671* (2013.01); *H04L 5/14* (2013.01); *H04W 24/08* (2013.01)

(58) Field of Classification Search
CPC ............ H01Q 3/22; H01Q 3/24; H01Q 3/26; H01Q 3/30; H01Q 3/36; H01Q 3/42; H01Q 3/267; H01Q 3/2605; H01Q 21/24; H04B 1/0475; H04B 1/0483; H04B 1/10; H04B 1/126; H04B 1/408; H04B 1/7107; H04B 7/024; H04B 7/0408; H04B 7/0413; H04B 7/0452; H04B 7/0617; H04B 7/0682; H04B 7/0671; H04B 7/0695; H04B 7/086; H04B 7/088; H04B 7/0848; H04B 7/10; H04B 7/15585; H04B 15/00; H04B 17/11; H04B 17/12; H04B 17/21; H04B 17/309; H04B 17/336; H03B 5/18; H03B 5/1212; H03B 5/1228; H03B 5/1243; H03B 5/1841; H03B 5/1852; H03B 9/00; H03B 19/00; H03B 2200/0084; H03L 7/081; H03L 7/099; H03L 7/18; H03L 7/183; H04L 25/0204; H04L 25/0328; H04L 25/08; H04L 2025/03426; H04W 16/28; H04W 24/02; H04W 28/04; H04W 52/42; H04W 72/1231; G01S 3/023; G01S 3/043; G01S 5/0215; G01S 7/024; G01S 7/40–7/41; G01S 7/411; G01S 7/4021; G01S 19/13; G01S 19/21–19/22; G01S 19/36; G01S 2007/406; G01S 2007/4069; G01S 2013/0245; G01S 2013/0263
USPC .................. 370/215–216, 241–252, 463–469
See application file for complete search history.

(56) References Cited

U.S. PATENT DOCUMENTS

| | | | |
|---|---|---|---|
| 4,044,359 | A | 8/1977 | Applebaum et al. |
| 4,079,318 | A | 3/1978 | Kinoshita |

(Continued)

FOREIGN PATENT DOCUMENTS

| | | |
|---|---|---|
| EP | 1 189 303 | 3/2002 |
| EP | 1 867 177 | 5/2010 |

(Continued)

OTHER PUBLICATIONS

Office Action issued for U.S. Appl. No. 13/888,057 dated Dec. 3, 2014.

(Continued)

*Primary Examiner* — Tri H Phan
(74) *Attorney, Agent, or Firm* — Pearl Cohen Zedek Latzer Baratz LLP

(57) ABSTRACT

A system and method for compensating phase differences between multiple local oscillators and group delay differences between multiple transceivers. The system may include; an antenna array; a plurality of transceivers connected to said antennas and operatively associated each with a local oscillator (LO), wherein at least some of the transceivers do not share a common LO, and wherein at least some of the LOs are using a common reference oscillator; a common digital beamformer circuit connected to the transceivers; a baseband processor configured to operate the system at a specified communication scheme; and a calibration circuit and software modules configured to eliminate or reduce mismatches and phase deviations between the different transceivers, wherein the calibration circuit and software modules are incorporated in system such that the elimination or reduction of mismatches and phase deviations is non-interrupting with a continuous operation of the system at the specified communication scheme.

24 Claims, 10 Drawing Sheets

(51) Int. Cl.
*H04L 12/26* (2006.01)
*H04B 7/06* (2006.01)
*H04L 5/14* (2006.01)
*H04W 24/08* (2009.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,094,165 A | 7/2000 | Smith | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,647,276 B1 * | 11/2003 | Kuwahara et al. | 455/562.1 |
| 6,697,622 B1 | 2/2004 | Ishikawa et al. | |
| 6,697,633 B1 | 2/2004 | Dogan et al. | |
| 6,735,182 B1 | 5/2004 | Nishimori et al. | |
| 6,834,073 B1 | 12/2004 | Miller et al. | |
| 6,842,460 B1 | 1/2005 | Olkkonen et al. | |
| 6,914,890 B1 | 7/2005 | Tobita et al. | |
| 6,927,646 B2 | 8/2005 | Niemi | |
| 6,934,541 B2 * | 8/2005 | Miyatani | 455/423 |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,154,960 B2 | 12/2006 | Liu et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,876,848 B2 | 1/2011 | Han et al. | |
| 7,881,401 B2 * | 2/2011 | Kraut et al. | 375/296 |
| 7,898,478 B2 | 3/2011 | Niu et al. | |
| 7,904,086 B2 | 3/2011 | Kundu et al. | |
| 7,904,106 B2 | 3/2011 | Han et al. | |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,111,782 B2 | 2/2012 | Kim et al. | |
| 8,115,679 B2 | 2/2012 | Falk | |
| 8,155,613 B2 | 4/2012 | Kent et al. | |
| 8,194,602 B2 | 6/2012 | van Rensburg et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,504,098 B2 | 8/2013 | Khojastepour | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,571,127 B2 | 10/2013 | Jiang et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,605,658 B2 | 12/2013 | Fujimoto | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,670,504 B2 | 3/2014 | Naguib | |
| 8,744,511 B2 | 6/2014 | Jones et al. | |
| 8,754,810 B2 * | 6/2014 | Guo et al. | 342/368 |
| 8,767,862 B2 | 7/2014 | Abreu et al. | |
| 8,780,743 B2 | 7/2014 | Sombrutzki et al. | |
| 8,797,969 B1 | 8/2014 | Harel et al. | |
| 8,891,598 B1 | 11/2014 | Wang et al. | |
| 8,928,528 B2 | 1/2015 | Harel et al. | |
| 8,942,134 B1 | 1/2015 | Kludt et al. | |
| 8,976,845 B2 * | 3/2015 | O'Keeffe et al. | 375/219 |
| 8,995,416 B2 | 3/2015 | Harel et al. | |
| 9,014,066 B1 | 4/2015 | Wang et al. | |
| 9,035,828 B2 * | 5/2015 | O'Keeffe et al. | 342/368 |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0085266 A1 | 4/2005 | Narita | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0286440 A1 | 12/2005 | Strutt et al. | |
| 2005/0287962 A1 | 12/2005 | Mehta et al. | |
| 2006/0041676 A1 | 2/2006 | Sherman | |

(56) References Cited

U.S. PATENT DOCUMENTS

| | | |
|---|---|---|
| 2006/0092889 A1 | 5/2006 | Lyons et al. |
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1 | 5/2008 | Gallagher et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0279478 A1 | 11/2009 | Nagaraj et al. |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1* | 4/2010 | Francos et al. ............ 455/562.1 |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0012134 A1 | 1/2013 | Jin et al. |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |

(56) References Cited

U.S. PATENT DOCUMENTS

| | | | |
|---|---|---|---|
| 2013/0156120 | A1 | 6/2013 | Josiam et al. |
| 2013/0170388 | A1 | 7/2013 | Ito et al. |
| 2013/0172029 | A1 | 7/2013 | Chang et al. |
| 2013/0188541 | A1* | 7/2013 | Fischer |
| 2013/0190006 | A1 | 7/2013 | Kazmi et al. |
| 2013/0208587 | A1 | 8/2013 | Bala et al. |
| 2013/0208619 | A1 | 8/2013 | Kudo et al. |
| 2013/0223400 | A1 | 8/2013 | Seo et al. |
| 2013/0229996 | A1 | 9/2013 | Wang et al. |
| 2013/0229999 | A1 | 9/2013 | Da Silva et al. |
| 2013/0235720 | A1 | 9/2013 | Wang et al. |
| 2013/0242853 | A1 | 9/2013 | Seo et al. |
| 2013/0242899 | A1 | 9/2013 | Lysejko et al. |
| 2013/0242965 | A1 | 9/2013 | Horn et al. |
| 2013/0242976 | A1 | 9/2013 | Katayama et al. |
| 2013/0252621 | A1 | 9/2013 | Dimou et al. |
| 2013/0272437 | A1 | 10/2013 | Eidson et al. |
| 2013/0301551 | A1 | 11/2013 | Ghosh et al. |
| 2013/0304962 | A1 | 11/2013 | Yin et al. |
| 2013/0331136 | A1 | 12/2013 | Yang et al. |
| 2013/0343369 | A1 | 12/2013 | Yamaura |
| 2014/0010089 | A1 | 1/2014 | Cai et al. |
| 2014/0010211 | A1 | 1/2014 | Asterjadhi et al. |
| 2014/0029433 | A1 | 1/2014 | Wentink |
| 2014/0071873 | A1 | 3/2014 | Wang et al. |
| 2014/0079016 | A1 | 3/2014 | Dai et al. |
| 2014/0086077 | A1 | 3/2014 | Safavi |
| 2014/0086081 | A1 | 3/2014 | Mack et al. |
| 2014/0098681 | A1 | 4/2014 | Stager et al. |
| 2014/0119288 | A1 | 5/2014 | Zhu et al. |
| 2014/0185501 | A1 | 7/2014 | Park et al. |
| 2014/0185535 | A1 | 7/2014 | Park et al. |
| 2014/0192820 | A1 | 7/2014 | Azizi et al. |
| 2014/0204821 | A1 | 7/2014 | Seok et al. |
| 2014/0241182 | A1 | 8/2014 | Smadi |
| 2014/0242914 | A1* | 8/2014 | Monroe ............... 455/63.4 |
| 2014/0269409 | A1 | 9/2014 | Dimou et al. |
| 2014/0307653 | A1 | 10/2014 | Liu et al. |
| 2015/0016438 | A1 | 1/2015 | Harel et al. |
| 2015/0018042 | A1 | 1/2015 | Radulescu et al. |
| 2015/0085777 | A1 | 3/2015 | Seok |
| 2015/0139212 | A1 | 5/2015 | Wang et al. |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Notice of Allowance issued for U.S. Appl. No. 14/297,898 dated Dec. 5, 2014.
Notice of Allowance issued for U.S. Appl. No. 14/281,358 dated Dec. 16, 2014.
Office Action issued for U.S. Appl. No. 14/250,767 dated Dec. 26, 2014.
Notice of Allowance issued for U.S. Appl. No. 14/097,765 dated Dec. 31, 2014.
Office Action issued for U.S. Appl. No. 14/181,844 dated Jan. 5, 2015.
Office Action issued for U.S. Appl. No. 14/306,458 dated Jan. 9, 2015.
International Search Report and Written Opinion for International Application No. PCT/US14/65958 dated Jan. 13, 2015.
Notice of Allowance issued for U.S. Appl. No. 14/198,155 dated Jan. 26, 2015.
Notice of Allowance issued for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, No. Ljubljana; Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, No. Valencia, Spain; Jan. 12, 2010, pp. 1-5.
Notice of Allowance issued for U.S. Appl. No. 13/925,454 dated Feb. 3, 2015.
Office Action issued for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued for U.S. Appl. No. 14/171,736 mailed Feb. 20, 2015.
Office Action issued for U.S. Appl. No. 14/320,920 dated Feb. 23, 2015.
Office Action issued for U.S. Appl. No. 13/775,886 dated Mar. 23, 2015.
Notice of Allowance issued for U.S. Appl. No. 14/449,431 dated Mar. 23, 2015.
Notice of Allowance issued for U.S. Appl. No. 14/273,866 dated Mar. 25, 2015.
Office Action issued for U.S. Appl. No. 14/517,114 dated Apr. 6, 2015.
Notice of Allowance issued for U.S. Appl. No. 13/925,454 dated Apr. 14, 2015.
Office Action issued for U.S. Appl. No. 14/543,357 dated Apr. 23, 2015.
Office Action issued for U.S. Appl. No. 14/450,625 dated Apr. 28, 2015.
Office Action issued for U.S. Appl. No. 14/250,767 dated Apr. 29, 2015.
Office Action issued for U.S. Appl. No. 14/181,844 dated May 13, 2015.
Office Action issued for U.S. Appl. No. 13/630,146 dated Jan. 22, 2013.
Office Action issued for U.S. Appl. No. 13/630,146 dated Mar. 27, 2013.
Office Action issued for U.S. Appl. No. 13/762,159 dated Apr. 16, 2013.
Office Action issued for U.S. Appl. No. 13/762,191 dated May 2, 2013.
Office Action issued for U.S. Appl. No. 13/762,188 dated May 15, 2013.
Office Action issued for U.S. Appl. No. 13/776,204 dated May 21, 2013.
Office Action issued for U.S. Appl. No. 13/770,255 dated Jun. 6, 2013.
Office Action issued for U.S. Appl. No. 13/776,068 dated Jun. 11, 2013.
Notice of Allowance issued for U.S. Appl. No. 13/762,159 dated Jun. 20, 2013.
Office Action issued for U.S. Appl. No. 13/775,886 dated Jul. 17, 2013.

(56) References Cited

OTHER PUBLICATIONS

Notice of Allowance issued for U.S. Appl. No. 13/762,191 dated Jul. 19, 2013.
Notice of Allowance issued for U.S. Appl. No. 13/630,146 dated Jul. 31, 2013.
Notice of Allowance issued for U.S. Appl. No. 13/762,188 dated Aug. 19, 2013.
Notice of Allowance issued for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued for U.S. Appl. No. 13/889,150 dated Sep. 25, 2013.
Office Action issued for U.S. Appl. No. 13/955,320 dated Oct. 15, 2013.
Office Action issued for U.S. Appl. No. 13/776,204 dated Oct. 23, 2013.
Office Action issued for U.S. Appl. No. 13/925,454 dated Oct. 28, 2013.
Office Action issued for U.S. Appl. No. 13/955,194 dated Oct. 30, 2013.
Office Action issued for U.S. Appl. No. 14/013,190 dated Nov. 5, 2013.
Office Action issued for U.S. Appl. No. 13/776,068 dated Nov. 5, 2013.
Office Action issued for U.S. Appl. No. 14/010,771 dated Dec. 17, 2013.
Office Action issued for U.S. Appl. No. 14/065,182 dated Dec. 17, 2013.
Office Action issued for U.S. Appl. No. 14/068,863 dated Dec. 17, 2013.
Office Action issued for U.S. Appl. No. 14/011,521 dated Dec. 23, 2013.
Office Action issued for U.S. Appl. No. 13/775,886 dated Jan. 7, 2014.
Office Action issued for U.S. Appl. No. 14/018,965 dated Jan. 13, 2014.
Office Action issued for U.S. Appl. No. 13/858,302 dated Jan. 16, 2014.
Office Action issued for U.S. Appl. No. 14/042,020 dated Jan. 16, 2014.
Office Action issued for U.S. Appl. No. 14/102,539 dated Jan. 27, 2014.
Office Action issued for U.S. Appl. No. 14/087,376 dated Jan. 29, 2014.
Notice of Allowance issued for U.S. Appl. No. 13/776,204 dated Jan. 31, 2014.
Office Action issued for U.S. Appl. No. 14/094,644 dated Feb. 6, 2014.
Notice of Allowance issued for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued for U.S. Appl. No. 14/109,904 dated Feb. 27, 2014.
Office Action issued for U.S. Appl. No. 13/925,454 dated Mar. 7, 2014.
Notice of Allowance issued for U.S. Appl. No. 14/172,500 dated Mar. 26, 2014.
Notice of Allowance issued for U.S. Appl. No. 14/065,182 dated Mar. 25, 2014.
Notice of Allowance issued for U.S. Appl. No. 14/068,863 dated Mar. 25, 2014.
Office Action issued for U.S. Appl. No. 14/010,771 dated Apr. 4, 2014.
Office Action issued for U.S. Appl. No. 14/085,352 dated Apr. 7, 2014.
Office Action issued for U.S. Appl. No. 13/889,150 dated Apr. 9, 2014.
Notice of Allowance issued for U.S. Appl. No. 13/955,194 dated Apr. 9, 2014.
Office Action issued for U.S. Appl. No. 14/097,765 dated Apr. 22, 2014.
Notice of Allowance issued for U.S. Appl. No. 14/087,376 dated May 9, 2014.
Office Action issued for U.S. Appl. No. 14/143,580 dated May 9, 2014.
Notice of Allowance issued for U.S. Appl. No. 13/776,068 dated May 13, 2014.
Office Action issued for U.S. Appl. No. 14/013,190 dated May 20, 2014.
Office Action issued for U.S. Appl. No. 14/085,252 dated Jun. 18, 2014.
Office Action issued for U.S. Appl. No. 14/094,644 dated Jun. 24, 2014.
Notice of Allowance issued for U.S. Appl. No. 14/102,539 dated Jun. 24, 2014.
Office Action issued for U.S. Appl. No. 14/011,521 dated Jul. 1, 2014.
Notice of Allowance issued for U.S. Appl. No. 14/109,904 dated Jul. 2, 2014.
Notice of Allowance issued for U.S. Appl. No. 13/889,150 dated Jul. 8, 2014.
Office Action issued for U.S. Appl. No. 14/250,767 dated Jul. 10, 2014.
Notice of Allowance issued for U.S. Appl. No. 14/085,352 dated Jul. 23, 2014.
Notice of Allowance issued for U.S. Appl. No. 14/013,190 dated Jul. 25, 2014.
Office Action issued for U.S. Appl. No. 14/198,280 dated Jul. 29, 2014.
Office Action issued for U.S. Appl. No. 14/042,020 dated Jul. 31, 2014.
Notice of Allowance issued for U.S. Appl. No. 14/010,771 dated Aug. 6, 2014.
Office Action issued for U.S. Appl. No. 14/306,458 dated Aug. 13, 2014.
Office Action issued for U.S. Appl. No. 14/297,898 dated Aug. 15, 2014.
Notice of Allowance issued for U.S. Appl. No. 14/085,252 dated Aug. 27, 2014.
Office Action issued for U.S. Appl. No. 14/181,844 dated Aug. 29, 2014.
Office Action issued for U.S. Appl. No. 14/296,209 dated Sep. 4, 2014.
Notice of Allowance issued for U.S. Appl. No. 14/097,765 dated Sep. 8, 2014.
Notice of Allowance issued for U.S. Appl. No. 14/143,580 dated Sep. 8, 2014.
Office Action issued for U.S. Appl. No. 14/198,155 dated Sep. 12, 2014.
Office Action issued for U.S. Appl. No. 14/173,640 dated Oct. 6, 2014.
Office Action issued for U.S. Appl. No. 14/449,431 dated Oct. 10, 2014.
Office Action issued for U.S. Appl. No. 14/171,736 dated Oct. 16, 2014.
Notice of Allowance issued for U.S. Appl. No. 14/011,521 dated Oct. 20, 2014.
Office Action issued for U.S. Appl. No. 14/320,920 dated Oct. 23, 2014.
Notice of Allowance issued for U.S. Appl. No. 13/889,150 dated Nov. 10, 2014.
Office Action issued for U.S. Appl. No. 13/775,886 dated Nov. 17, 2014.
Notice of Allowance issued for U.S. Appl. No. 14/198,280 dated Nov. 18, 2014.
Office Action for U.S. Appl. No. 14/480,920 dated Nov. 18, 2014.

(56) References Cited

OTHER PUBLICATIONS

Office Action issued for U.S. Appl. No. 14/481,319 dated Nov. 19, 2014.
Office Action issued for U.S. Appl. No. 14/273,866 dated Nov. 28, 2014.
Office Action issued for U.S. Appl. No. 14/042,020 dated Dec. 1, 2014.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International Application No. PCT/US2014/062116 dated Jun. 22, 2015.
Office Action issued by the United States Patent and Trademark Office for U.S. Appl. No. 14/467,415 dated Jun. 30, 2015.
International Search Report and Written Opinion for PCT International Application No. PCT/US2014/063304 dated Jul. 8, 2015.
Bandyopadhyay, S. et al., "An Adaptive MAC Protocol for Wireless Ad Hoc Community Network (WACNet) Using Electronically Steerable Passive Array Radiator Antenna", Globecom '01 : IEEE Global Telecommunications Conference; San Antonio, Texas, USA, Nov. 25-29, 2001, IEEE Operations Center, Piscataway, NJ, vol. 5, Nov. 25, 2001, pp. 2896-2900.
Du, Yongjiu et al., "iBeam: Intelligent Client-Side Multi-User Beamforming in Wireless Networks", IEEE INFOCOM 2014—IEEE Conference on Computer Communications, IEEE, Apr. 27, 2014, pp. 817-825.
Office Action issued by the United States Patent and Trademark Office for U.S. Appl. No. 13/888,057 dated Jul. 9, 2015.
Office Action issued by the United States Patent and Trademark Office for U.S. Appl. No. 14/173,640 dated Jul. 16, 2015.
Office Action issued by the United States Patent and Trademark Office for U.S. Appl. No. 14/517,114 dated Jul. 28, 2015.
Office Action issued by the United States Patent and Trademark Office for U.S. Appl. No. 14/672,634 dated Aug. 12, 2015.

* cited by examiner

METHOD AND SYSTEM FOR CALIBRATING A TRANSCEIVER ARRAY

CROSS-REFERENCE TO RELATED APPLICATIONS

This application claims benefit from U.S. provisional patent application Ser. No. 61/898,802 filed Nov. 1, 2013, which is incorporated herein by reference in its entirety.

FIELD OF THE INVENTION

The present invention relates generally to wireless communication, and more particularly to local oscillators in multiple channel transceivers.

BACKGROUND OF THE INVENTION

Implementations of a multiple-antenna beamformer may require the use of multiple radio circuits that feed these antennas. Some implementations are based on an array of discrete mixers controlled by a common LO (Local Oscillator) where the number of radio circuits is unlimited, but cost, power consumption, real estate and reliability are not optimal. Some other implementations offer an integrated RFIC (Radio-Frequency-Integrated-Circuit) controlled by a common integrated LO, yet, the number of radios is typically to few limited combinations e.g. 2 or 4 or 8 integrated radio circuits in a commercially available RFICs. Hence when a larger number of radio circuits is required, staking an array of RFICs together may be a preferable approach, provided the LOs in each of the RFICs can be locked to each other via external circuitry and procedures.

Such an array of RFICs may maintain frequency lock when all LOs are using a common crystal reference, yet in some cases phase lock mechanism must be implemented each time the radios are retuned, as well on a periodic basis that will counter the effect of phase drift.

FIG. 1 depicts a beamforming TD-LTE base station according to the prior art which includes multiple radio circuits 120-1, 120-2, up to 120-M, that feed or provide input to an antenna array of M elements 110-1, 110-2, up to 110-M, where the multiple radio circuits and antennas are used for beamforming FIG. 1 further illustrates an example where the aforementioned beamforming capability may be used for the implementation of Multi-User MIMO, where up to N data streams are simultaneously served (e.g. in data communication with) by N baseband entities 140-1, 140-2, up to 140-N, where N<M. FIG. 1 further depicts an example implementation using a common local oscillator 150 configured to feed or provide input to the multiple radio circuits, so that digital beamformer 130 weights applied to baseband signals, are routed through the multiple radio frequency (RF) chains with a wells controlled resultant phases.

FIG. 2 depicts another possible block diagram similar to the one in FIG. 1, also in accordance with the prior art, where the radio circuits used are integrated Radio-Frequency-Integrated-Circuits (RFICs) 220-1, 220-2, up to 220-M, and where the LO are implemented inside and fed by a common reference clock 250; however, such a solution guarantees frequency lock but does not provide phase lock across the array, which makes it unfit for beamforming. The problem stems from the fact that while LOs are frequency locked, their relative phases may drift. Therefore, for beam forming purposes, the architecture shown in FIGS. 1 and 2 will not work properly.

SUMMARY OF THE INVENTION

In accordance with embodiments of the present invention, a system for compensating phase differences between multiple local oscillators is provided. The system may include for example: an antenna array; a plurality of transceivers connected to the antennas and operatively associated each with a local oscillator (LO), wherein at least some of the transceivers do not share a common LO (e.g. connected to the same LO), and wherein at least some of the LOs are using a common reference oscillator; a common digital beamformer circuit connected to the transceivers; a baseband processor configured to operate the system at a specified communication scheme; and a calibration circuit and software modules executed by the baseband processor and configured to eliminate or reduce mismatches and phase deviations between the different transceivers, wherein the calibration circuit and software modules are incorporated in system such that the elimination or reduction of mismatches and phase deviations is non-interrupting with a continuous operation of the system at the specified communication scheme. In some embodiments, reduction of mismatches, phase deviations, etc., may include elimination of these phenomena.

Embodiments of the present invention includes a phase calibration apparatus and procedure that guarantees phase lock across an array of multiple separated radios, and a method of performing such calibration in multiple radios systems that operate in Time-Domain-Duplex (TDD).

Embodiments of the present invention include a digital beamforming array, serving a TDD air-protocol Base Station or User Equipment, where an antenna array of N antennas is fed by an array of N radio circuits, which in turn are digitized and fed into a common digital beamformer entity. The radio circuits may include an array of integrated RFICs or modules where their LOs are hooked into a common crystal reference. The phase of each integrated radio which may be different, is calibrated on a system level via a disclosed phase correction auxiliary circuitry and calibration procedure.

Embodiments of a phase correction system and method may calibrate the array of down-converting radio circuits' signals so that phase variations created at the receive circuitries are known before received digital beamforming is performed; it may also calibrate the array of up-converting radio circuits so that phase variation created in the transmit circuitries are known before transmitted digital beamforming is performed.

Acquiring knowledge of the receiving radio circuits' phase variations may be done by injection of a common known pilot signal via an auxiliary up-converter to each of the radios inputs, where the pilot is originated at the common digital beamforming entity, and measuring the output of each radio circuits' receivers by the common digital beamforming entity, which then compares the input and output phases, to derive receive radio circuitries phase variation knowledge.

Acquiring knowledge of the transmission radio circuits' phase variations may be done by feeding each of the transmission radio circuitries' input with a common known pilot signal originated at the common digital beamforming entity, and injecting the outputs of the transmission radio circuitries into input an auxiliary down-converter circuitry that is digitized and fed back into the common digital beamforming entity, which then compares the input and output phases, to derive transmit radio circuitries phase variation knowledge.

Embodiments of the present invention further provide a method for TDD systems, where the up-converters' and down-converters' phase variations calibration, is done in way that does not require extra spectrum or extra bandwidth, via using the time gap between TDD transmission and reception for the injection of the calibration signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1:
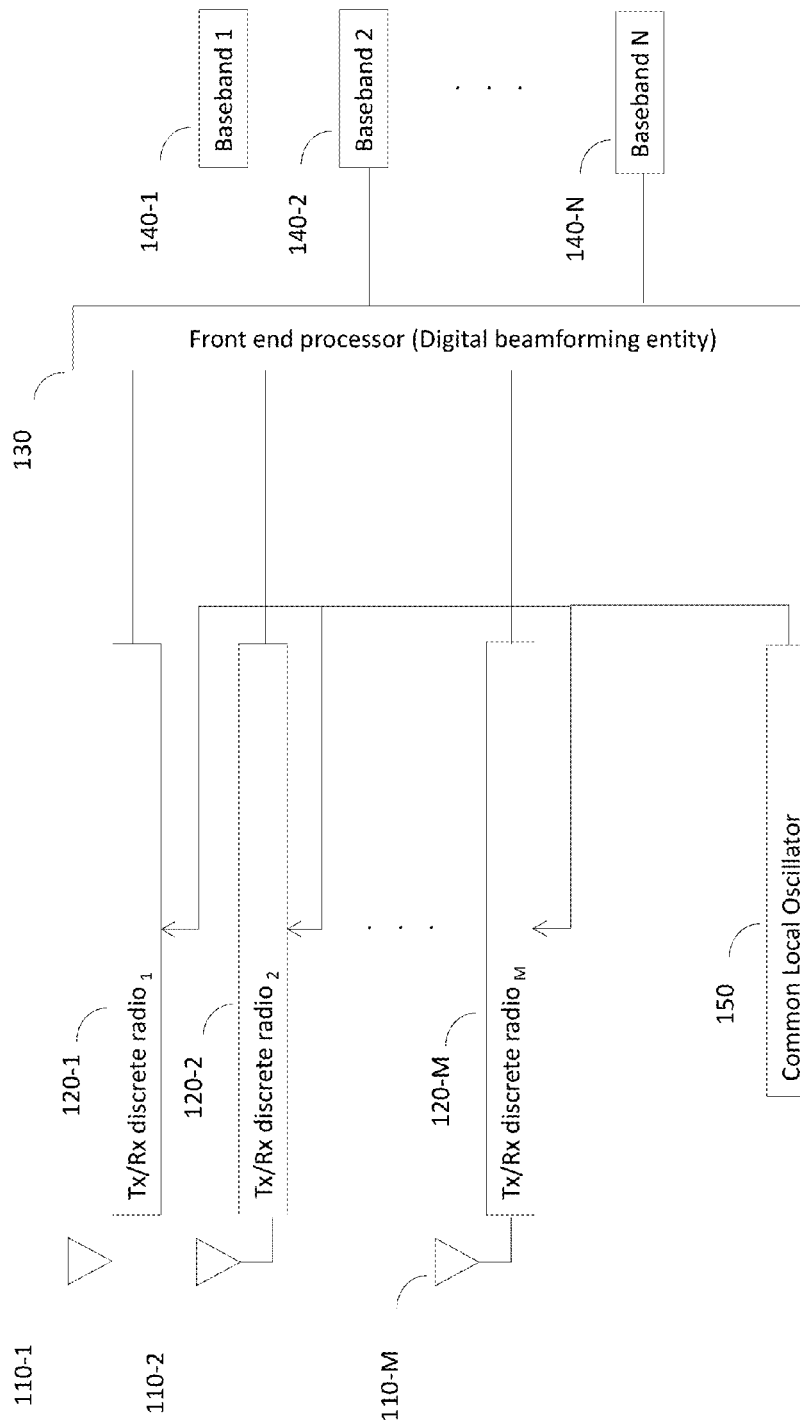
FIG. 1: A TDD multi antenna base station using discrete radio implementation in accordance with the prior art.
Figure 2:
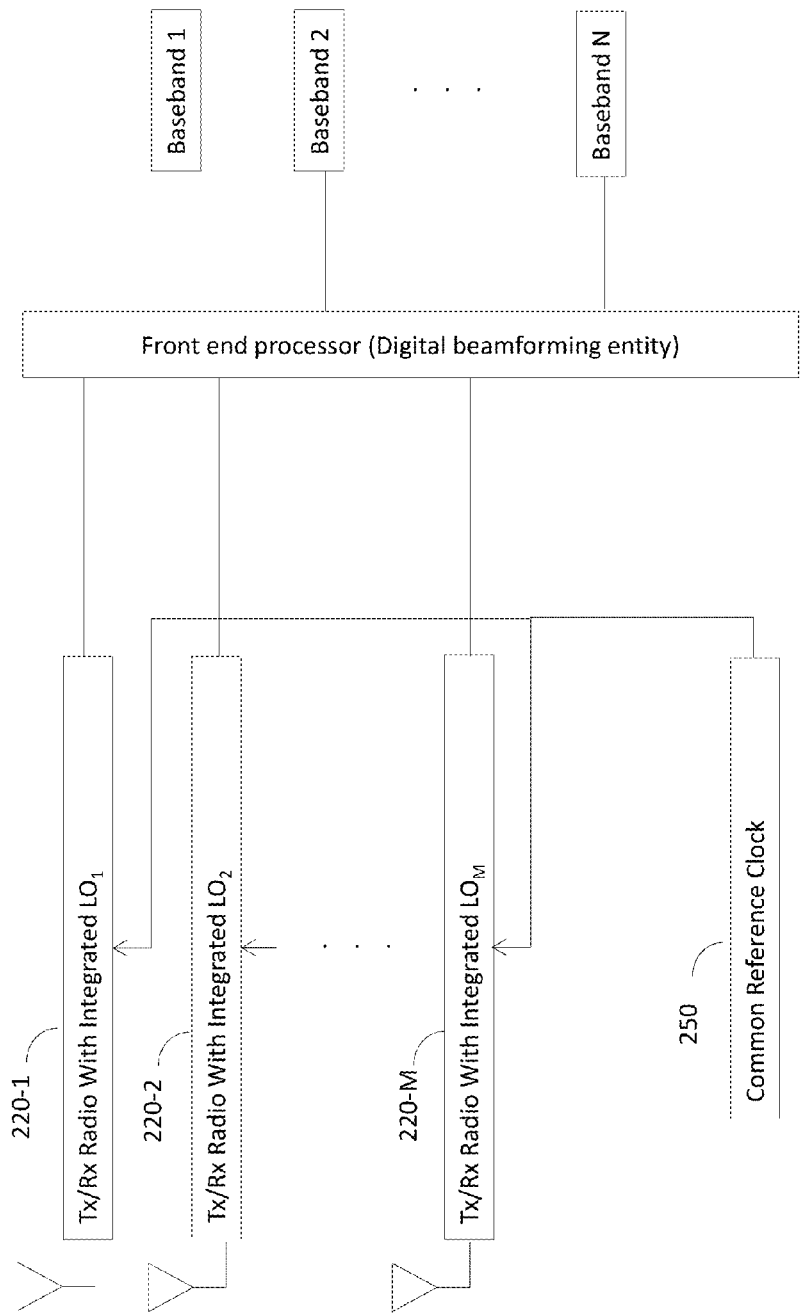
FIG. 2: A TDD base station with separate local oscillators using a common reference clock accordance with the prior art.
Figure 3:
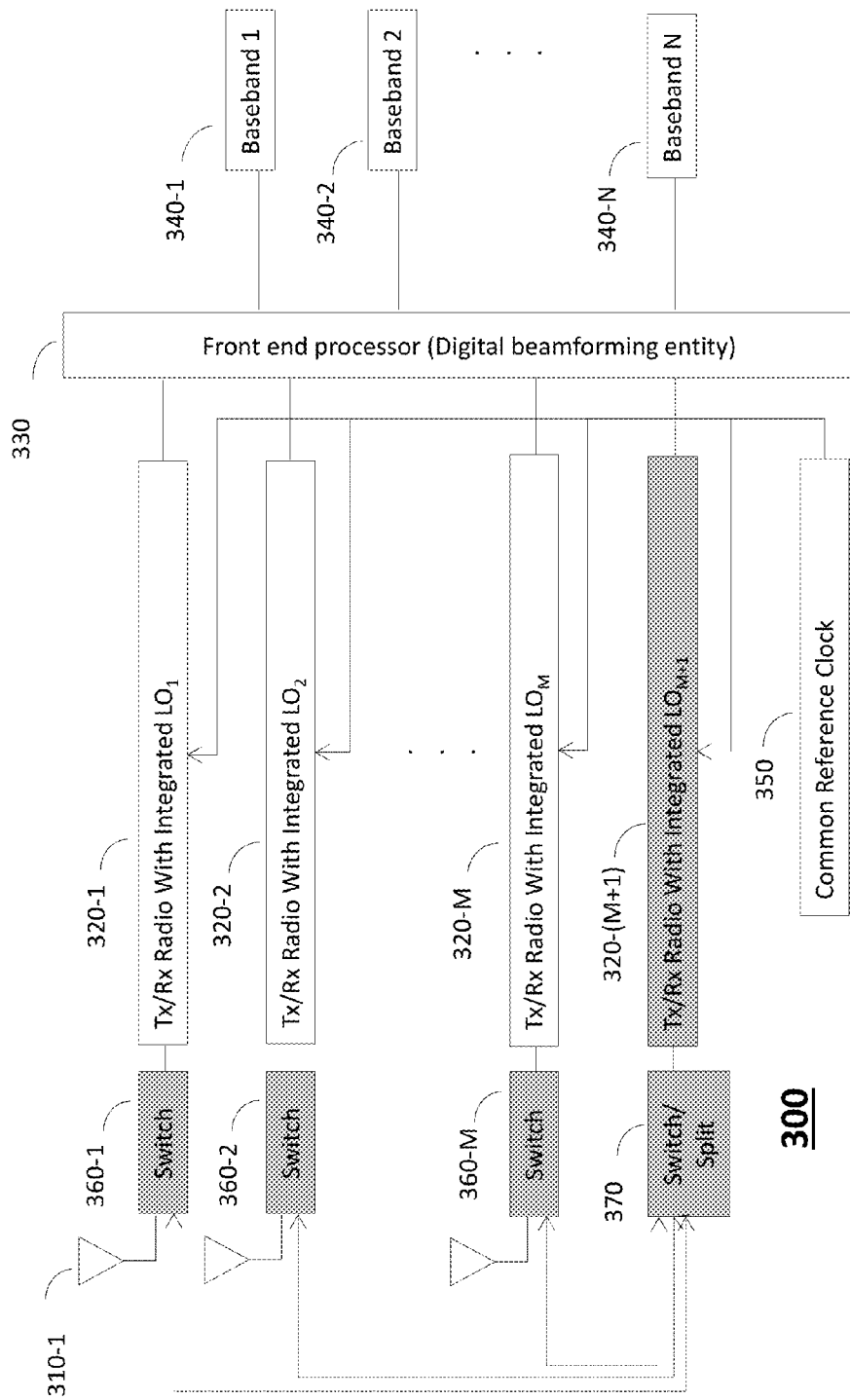
FIG. 3: Injecting a common pilot into TDD base station's receivers array's inputs in accordance with embodiments of present invention.

FIG. 3 depicts an upgraded block diagram, where the circuitry of FIG. 2, including all of its components, is augmented by an auxiliary Tx/Rx RFIC 320-(M+1) which feeds or provides input to an RF switch 370, and is further augmented by an array of RF switches 360-1, 360-2, up to 360-M. The auxiliary radio circuit may be used to inject a calibration pilot signal into the RFICs inputs, as well as to receive another calibration pilot signal from the RFICs outputs, so that phases variations created by each of the integrated LOs, together with other phase deflection contributions, are measured in both transmission and receptions paths.

Figure 4:
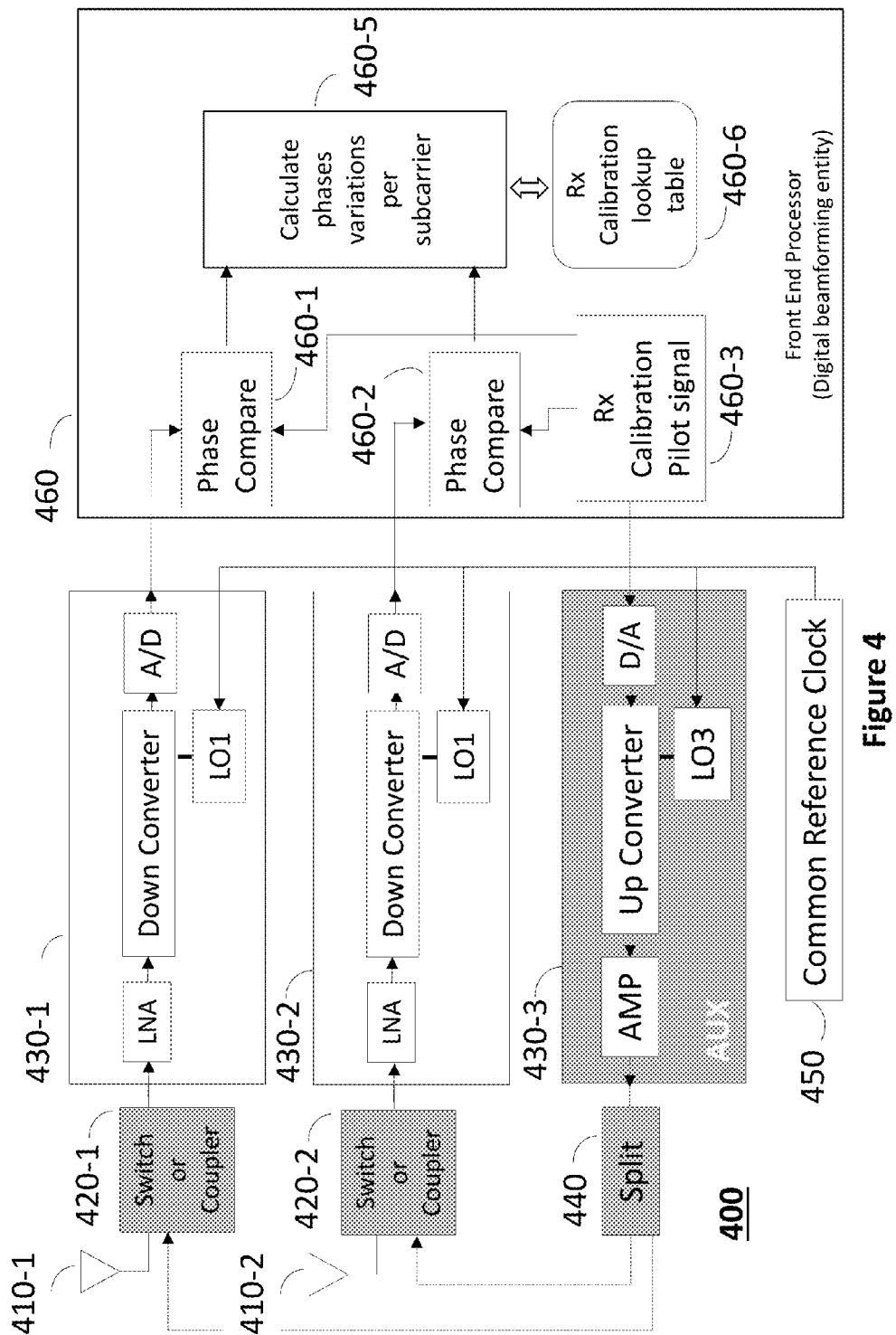
FIG. 4: An example of injecting a pilot into a TDD base station's receivers, via an auxiliary up converter circuitry in accordance with embodiments of present invention.

FIG. 4 depicts an example of a TDD base station with two antennas 410-1, 410-2. The corresponding two down-converter parts of the radios 430-1, 430-2 are connected to their respective antennas via switches 420-1, 420-2, where the switches may also be implemented as couplers; an auxiliary up-converter 430-3 and its front end RF splitter 440 are connected to the switches or couplers; both the down-converters and the auxiliary up-converter are fed by a common reference clock 450; the down-converters feed or provide input to the common digital beamformer entity, which compares it with the pilot's phase via phase comparisons 460-1, 460-2, calculates phase variations per subcarrier (460-5), and stores the results in a calibration lookup table 460-6.

Figure 5:
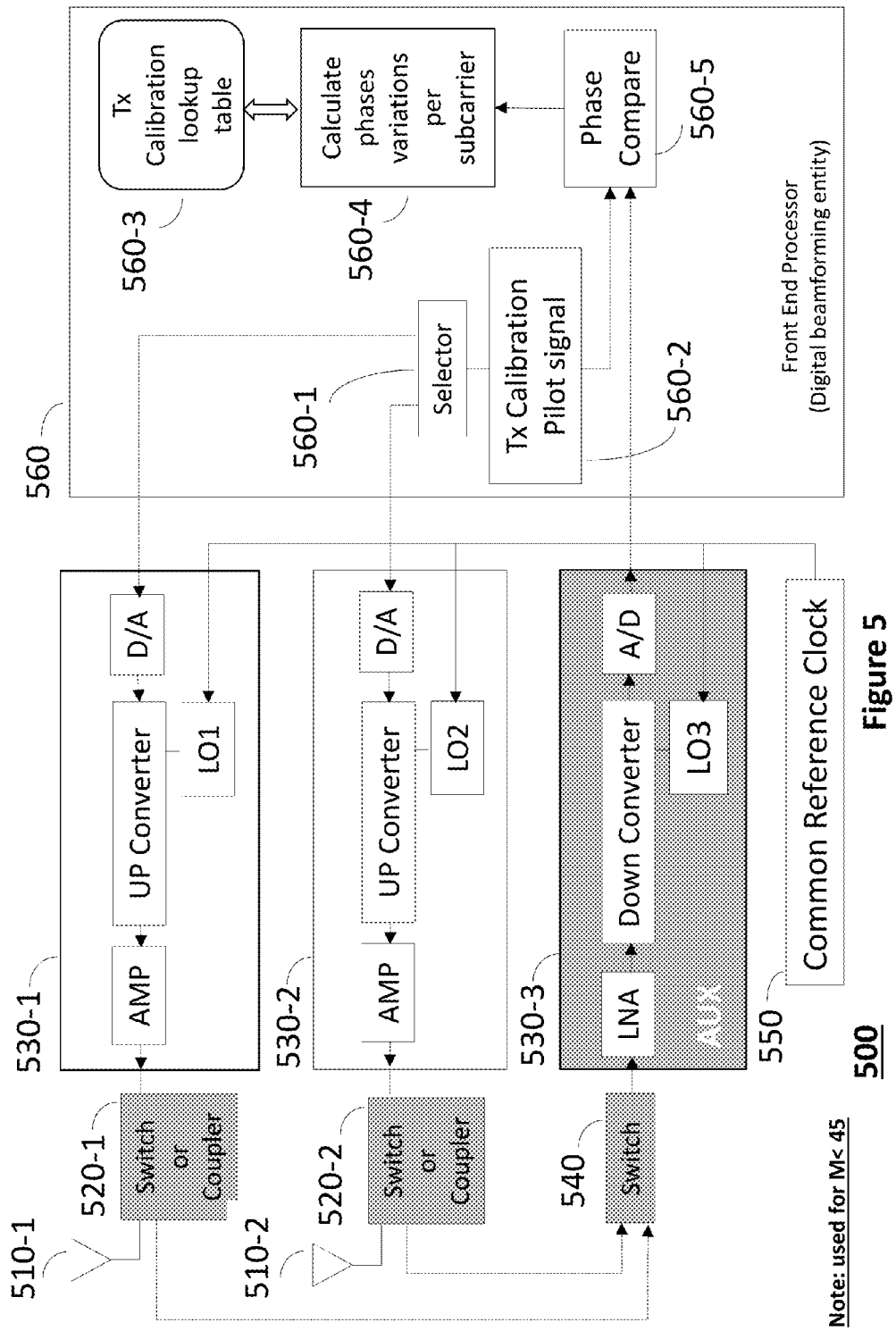
FIG. 5: An example of feeding a pilot into TDD base station's Tx array and measuring the output signals in accordance with embodiments of present invention.

FIG. 5 depicts an example of a TDD base station with two antennas 510-1, 510-2. The corresponding two up-converter parts of the radios 530-1, 530-2 are connected to their respective antennas via switches 520-1, 520-2, where the switches may also be implemented as couplers. An auxiliary down-converter 530-3 and its front end RF switch 540 are connected to the switches or couplers. Both the up-converters and the auxiliary down-converter are fed by a common reference clock 550; note that the reference 550 is the same one depicted in FIG. 4 as reference clock 450; the common digital beamforming entity injects a Tx calibration pilot 560-2 via a selector 560-1 into each of the up-converters part of the 530-1 and 530-2 radios in a sequential order, and each time the output of the up-converters is fed into the input of the auxiliary down-converter 530-3, which feeds or provides input to the resultant digital signal into a phase comparator 560-5 that calculates the phase difference between each up-converter path and the pilot signal, per subcarrier (560-4), to be stored at the Tx calibration lookup table. Note: FIG. 5 is applicable for an apparatus with up to 48 antennas, as explained with respect to FIG. 9.

According to some embodiments of the present invention, the calibration circuit and baseband processor executing software modules may include hardware and software, enabling the common digital beamformer to generate calibration pilot signals injected to the inputs of receiving parts of the transceivers, via a digital-to-analog converter and an additional RF up-converter, and further configured to determine phase and amplitude differences between the plurality of transceivers' receivers, based on the digital output of the receivers across the bandwidth of the transceiver. The specified communication scheme may be Time-Domain-Duplex (TDD) exhibiting a time gap between transmit and receive According to other embodiments of the present invention the calibration circuitry and software modules may be based on auxiliary hardware and auxiliary software, enabling the common digital beamformer entity to pick up its own downlink signal from each transmitting part of the transceivers, via a calibration RF down-converter and an analog-to-digital converter, and further configured to determine phase and amplitude differences between the plurality of transceivers' transmitters, based on the digital output of the transmitters across the bandwidth of the transceiver, where the down-converter input may be sequentially switched between each of the transmitting part of the transceivers. In some embodiments, the calibration pilot may include a narrowband signal.

According to some embodiments of the present invention the baseband processor may be configured to avoid interruption of the operation of the system for calibration purposes, for example by using the transmit-receive time gap for switching the receivers array away from the antenna array, and connecting them to outputs of the calibration RF up-converter, and feeding the input of the up-converter with a calibration pilot signal generated by the common digital beamformer, for a partial part of the time gap, and further measuring the digitized output of the receivers array by the common digital beamformer.

According to some embodiments of the present invention the baseband processor may be further configured to avoid interruption of the operation of the system for calibration purposes by sequentially feeding the transmitting part of the transceivers via an RF splitter to the input of the calibration down-converter and measure the down-converter digitized output during the time gap between transmit and receive.

According to other embodiments of the present invention, the time gap between transmit and receive may be divided up into several fields, so that the first field is left unused for guard time purposes, then the next field may be used for receivers calibration, then the next one is used for calibration processing by the common digital beamformer, then the next one may be used to apply phase adjustment to RF or digital parts of the system, and then the last field is not used to allow for guard time before switching back to active mode is taking place.

According to other embodiments of the present invention, the down-link RF output of a given transceiver may be fed into the calibration RF down-converter for at least few μsecs before the transmit timeslot is ending, and after transmission may be turned off, the digital output of the down-converter may be captured and processed by the common digital beamformer, and phase adjustment may be subsequently applied.

According to other embodiments of the present invention, a selection of a specific time period for wideband calibration may be based on measurements of temperature fluctuation and current fluctuations at the power amplifiers array, and the setting of thresholds that will increase sampling rate per increased fluctuation magnitude. Alternatively, the selection of specific time period for narrow band calibration addressing the LO phase alignment, may be based on factory measurements (e.g. calibration process during production) that determine inter-transceiver phase uncertainty over time.

Figure 6:
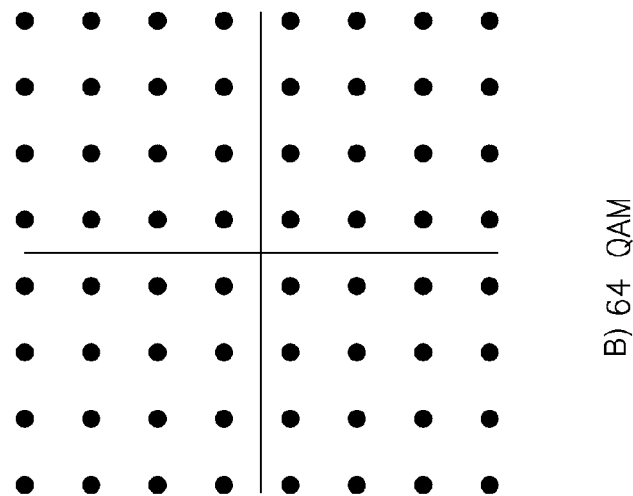
FIG. 6: An example of a calibration signal's modulation in accordance with embodiments of present invention.
Figure 6:
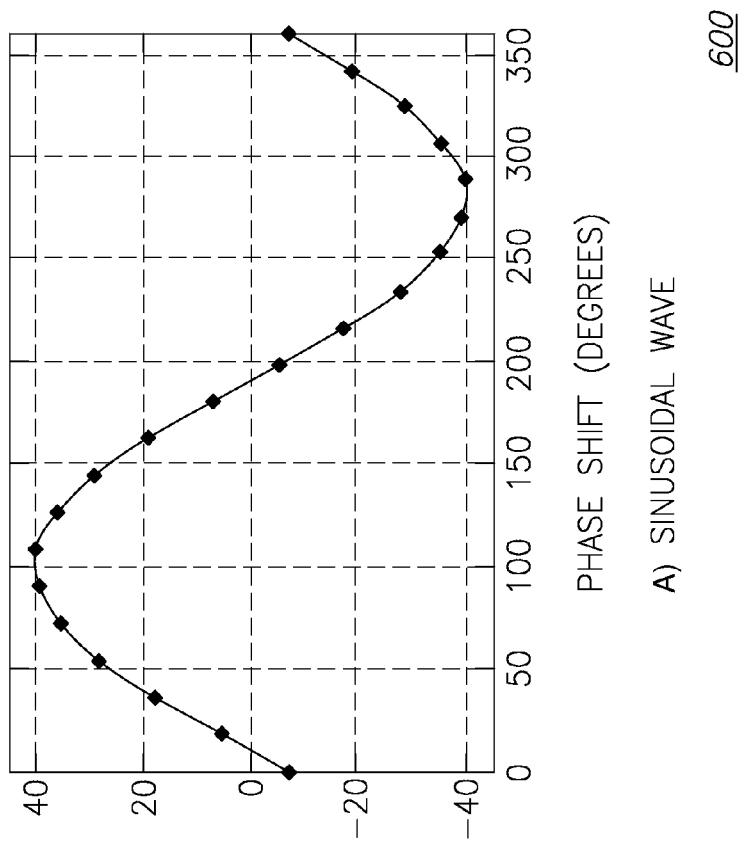

FIG. 6 describes several examples of pilot modulation: A) depicts a sinusoidal waveform, B) depicts a 64 QAM modulation.

Using a narrowband sine wave pilot tone may allow accurate phase measurement for a given subcarrier, and it may be sufficient to gain knowledge of the LO phase shift versus a reference. Phase comparison may be implemented via correlations or via FFT.

Using a broadband pilot like a 64 QAM modulation which occupies the entire bandwidth, provides also wideband calibration, addressing the non-flat transfer function of the various RF components. The correction value can be computed using the following calculation:

Given an input signal $S_{in}$, a measured output signal $S_{out}$, and an unknown circuit transfer function T, then $S_{out}=T*S_{in}$.

For each subcarrier i by applying a fast Fourier transform (FFT) of above equation, it becomes $s_{out}(i)=t(i)*s_{in}(i)$ Phase of the transfer function $\hat{t}(i)$ for subcarrier i can be estimated by Zero Forcing, e.g., $\hat{t}(i)=s_{out}(i)/s_{in}(i)$, or MMSE in frequency domain.

Figure 7:
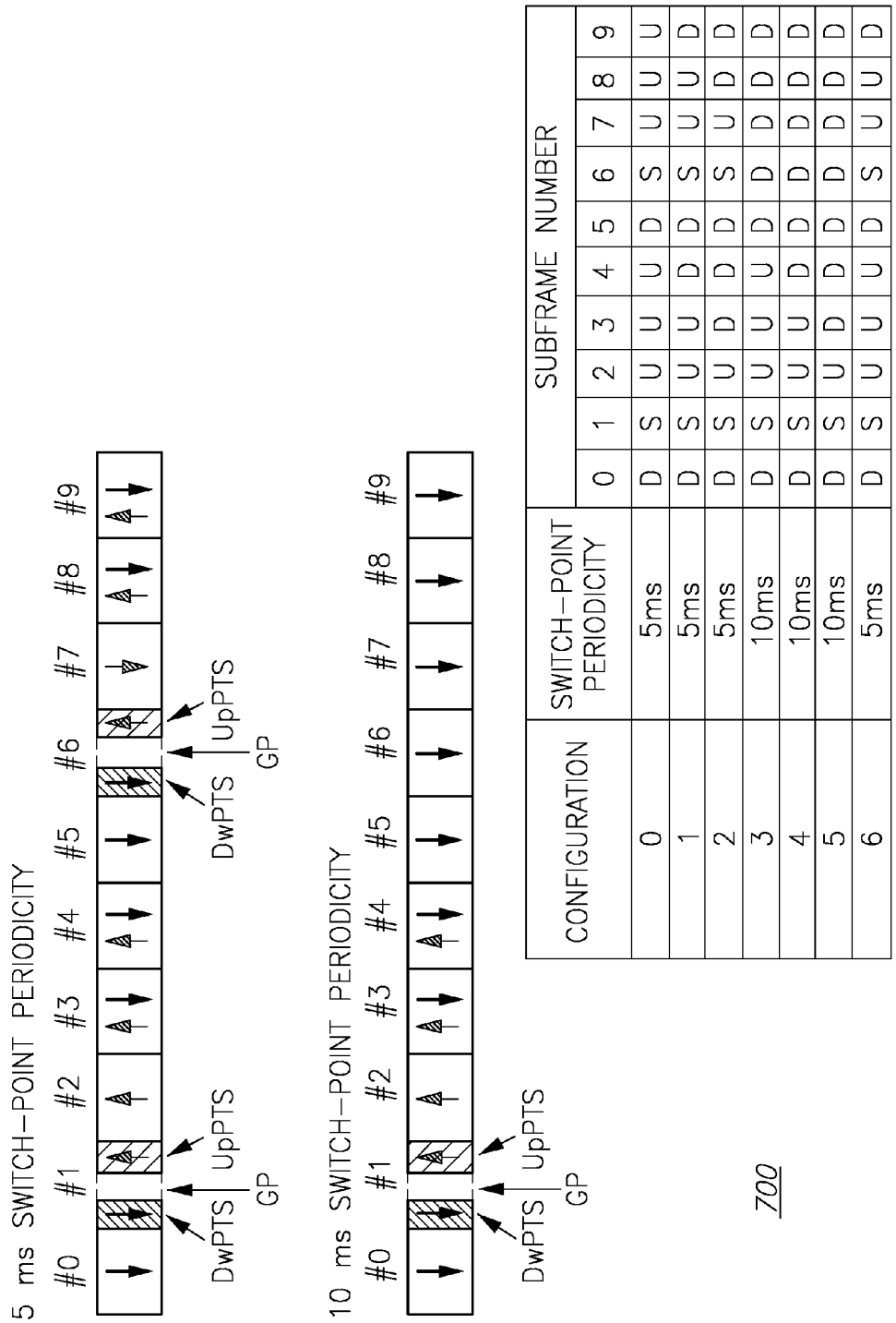
FIG. 7: A TD-LTE frame structure accordance with embodiments of present invention.

FIG. 7 depicts the structure of a TD-LTE air protocol frame. In one embodiment the frame can be for example a 5 ms or a 10 ms switch point periodicity, and in both there is a time gap labeled GP. Embodiments of the present invention disclose a system and a method to use the GP gap for phase calibration of both transmission and reception parts of the transceivers in a periodic regime.

Figure 8:
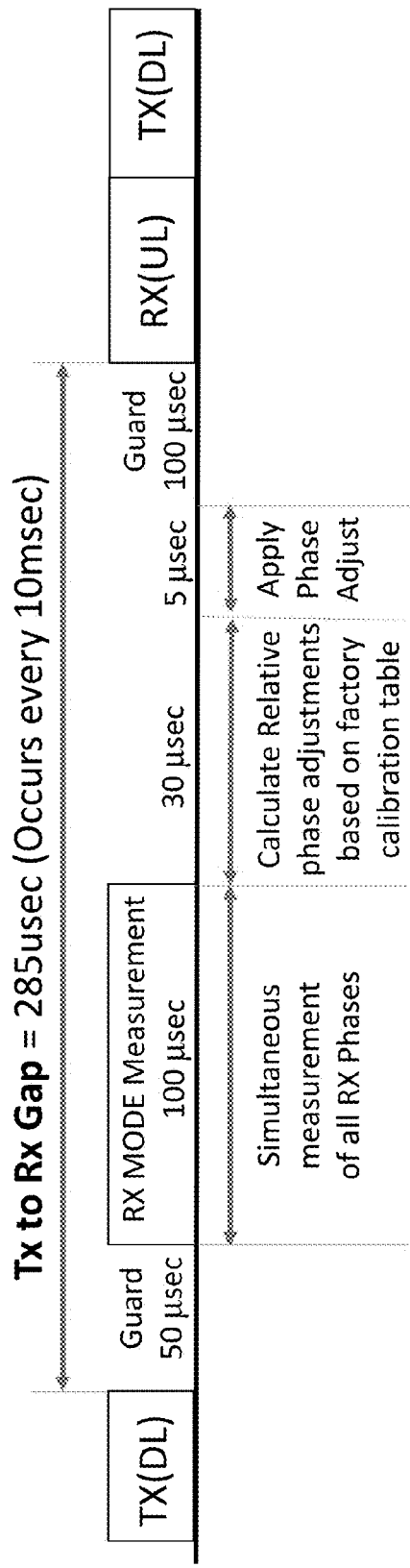
FIG. 8: An example of Rx Mode Phase Compensation Timing Example for TD-LTE in accordance with embodiments of present invention.

FIG. 8 describes an example of using the TD-LTE time gap between transmissions of down and up links for calibration of the receiving parts of the radios array, illustrated for the case of a 10 ms switch point (as with other embodiments described herein, other specific parameters may be used):

The time gap is assumed to be 285 μsec.

Starting with a guard time e.g. 50 μsec.

Continue with a simultaneous measurement of all receiving parts of the radio array, e.g. over 100 μsec.

Process the measurements in the common digital beamforming entity e.g. over 30 μsec.

Apply the weights according to the beamforming calibration lookup table, for example, over 5 μsec.

Leave approximately 100 μsec for a guard time before switching takes place.

Figure 9:
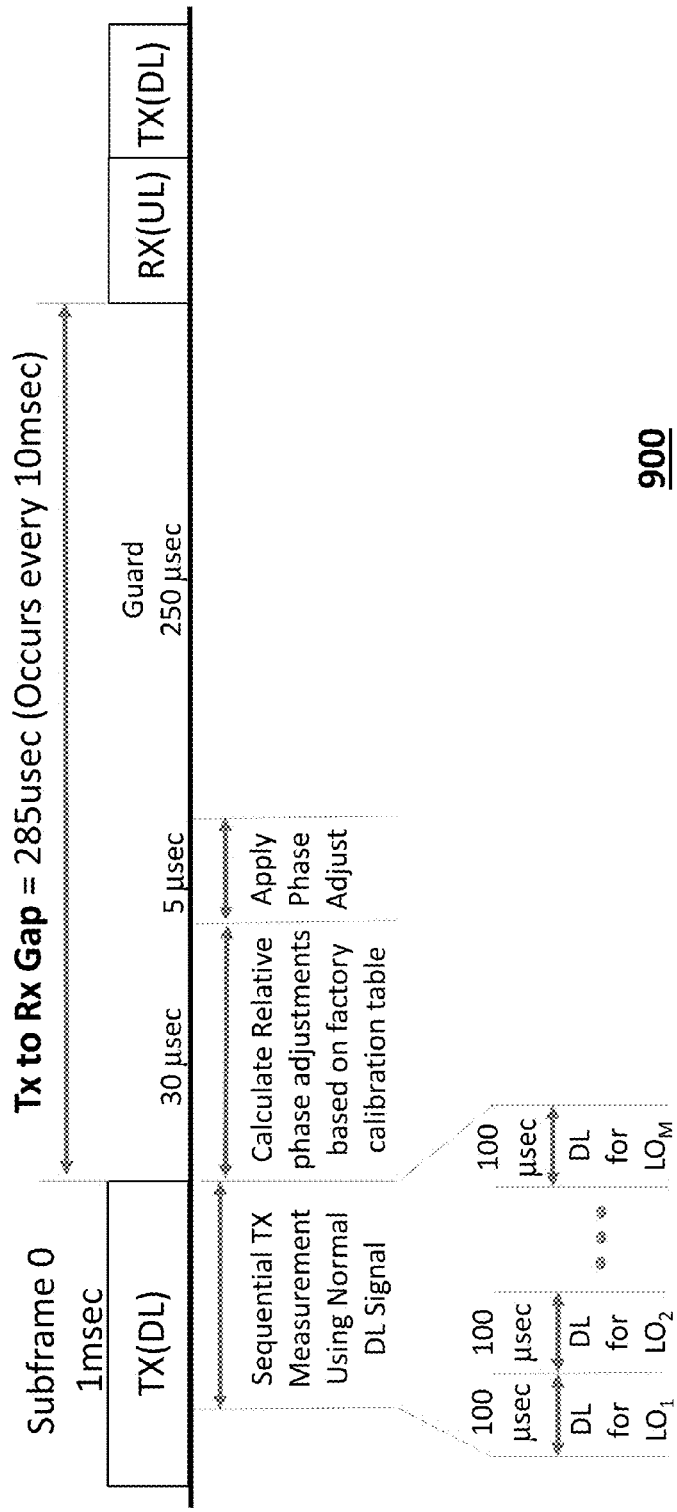
FIG. 9: An example of Tx Mode Phase Compensation Timing for TD-LTE with M LO's in accordance with embodiments of present invention.

FIG. 9 describes an example of using the TD-LTE time gap between transmissions of down link and uplink for calibration of the transmitting parts of the radios array, illustrated for the case of a 10 ms switch point:

The transmission calibrations may alternate with the reception calibrations.

Measure via the auxiliary down-converter live transmission of data during subframe 0 which includes Sequential TX Measurement Using Normal DL Signal.

During the 1 ms time period of subframe 0, alternating through the M<15 antennas so that each is allocated with at least one full symbol; Calculate Relative phase adjustments based on factory calibration table and then apply phase. It should be noted that in FIG. 9 maximum of 10 antennas are assumed so each is allocated with 100 μsecs. In case the number of antennas is larger than 15, continue calibrating the next batch of antennas during the next gap.

As long as the number antennas M does not exceed 45, then 3 switching cycles cover the transmission circuitry calibration within 3×10 ms intervals while the receiving circuitry calibration may be done each interval. The 4th can be used for reception circuitry calibration, yielding a total of 40 ms which is under the 50 ms assumed max duration;

When M>45, then the embodiment in the FIG. 5 block diagram may require augmentation by an additional auxiliary down-converter, which allows calibrations of Tx RF circuitries in pair, and so on and so forth.

Figure 10:
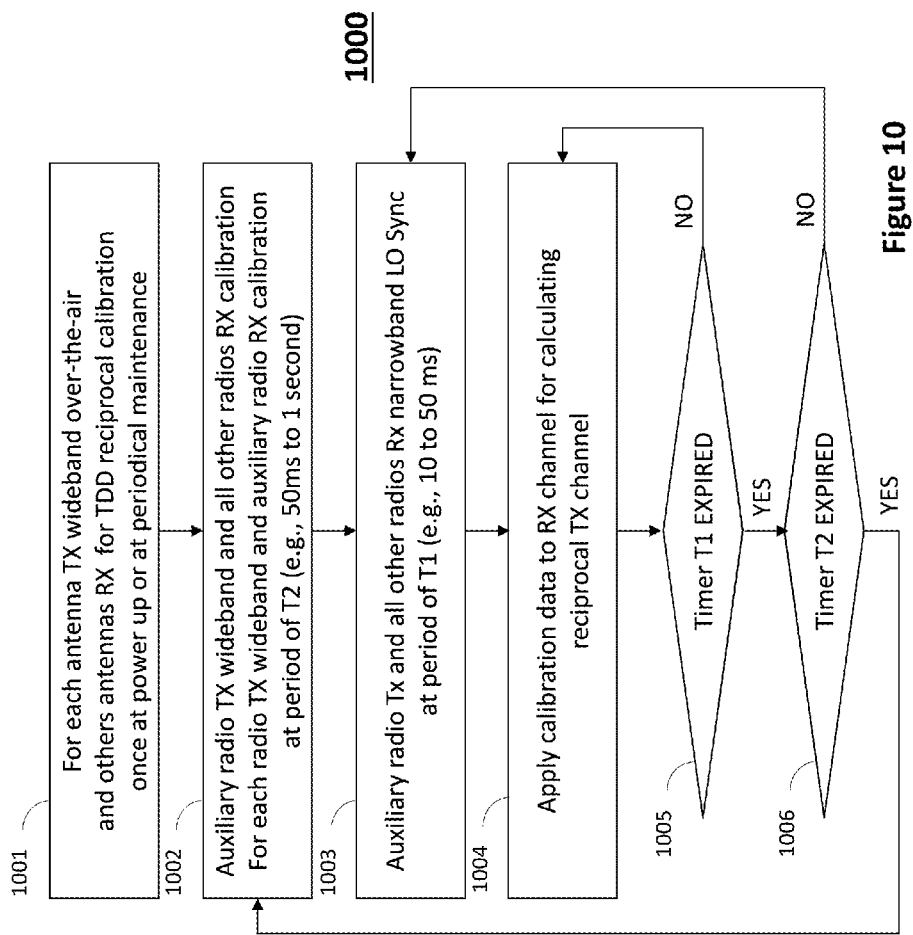
FIG. 10: An example of three-stage calibration for TD-LTE with M LO's and radios in accordance with embodiments of present invention.

FIG. 10 Depicts three stages calibration for TDD multiple LOs and radios.

The calibration goals of the downlink circuitry may be to guarantee sufficient compliance of the RF system with the digital processing system, e.g. that signals received by multiple antennas and fed into the inputs of a multichannel RF system, will be transformed into digital signals without distortion of each signal and its inter-relations with other signals, or that such distortions will be made know to the digital system.

Similarly, the calibration goals of the uplink circuitry, may be to guarantee that digital signals fed into the inputs of multichannel RF systems, are transferred to the antennas inputs without distortion of each signal and its inter-relations with other signals.

In one embodiment, metrics for a sufficient calibration may be based on estimating the RF and digital systems combined capabilities to create a deep enough null, e.g. to guarantee a minimum null depth.

For example, in an 8 arm multichannel beamforming system, with calibration that eliminates amplitude variations, and provides phase uncertainty of 2 degree or less, a null depth can be calculated as for example 20*log 10(1/57.30) =−35 dB.

The factors that govern RF circuitry phase uncertainty are temperature drifts, power supply voltage fluctuations, and loading; such variations may be slow or fast, e.g. may require calibration frequency of once per second or 20 times per second.

The factors that govern LOs coherency across the various RF channels are phase noise and LO frequency re-tuning rate. The fastest change may occur in the latter case every frame, therefore calibration must take place at the switching gap between transmit and receive.

Referring to FIG. 10, operation 1001 outlines a first stage calibration performed after initial installation, and later on at periodical maintenance. This stage is based on over-the-air transmission of one of the base station's antennas towards the others, in a round robin sequence, measuring wideband antennas coupling and mismatch, Power Amplifiers wideband non-linearity, and RF circuitry misalignments.

Operation 1002 outlines a second operation calibration where the wideband calibration, for both the receive circuitry and transmitting circuitry, takes place, every T2 millisecond, e.g. 50-1,000 milliseconds, where the specific T2 value may be calculated based on continuous sensing of Power Amplifier's (PA's) temperature and nonlinearity versus temperature factory measurements of the PAs, and further, on continuous measurement for current fluctuation thru the PAs current fluctuation and nonlinearity versus current factory measurements of the PAs.

Operation 1003 outlines the third stage of calibration, for the receive circuitry only, where narrowband calibration takes place during every frame's gap T1 of for example 5 or 10 milliseconds. Operation 1004 describes the application of calibration data derived from above three stages to RX channel for calculating reciprocal TX channel. Operation 1005, and operation 1006 describe the T1 and T2 counters.

Advantageously, embodiments of the present invention may be implemented as a part of a base station or a subscriber unit. In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
    an antenna array comprising antennas;
    a plurality of transceivers connected to said antennas and each transceiver operatively associated with a local oscillator (LO), wherein at least some of the transceivers are not associated with the same LO, and wherein at least some of the LOs use a common reference oscillator;
    a common digital beamformer circuit connected to said transceivers;
    a baseband processor configured to operate the transceivers and beamformer circuit at a specified communication scheme; and
    a calibration circuit,
    wherein said calibration circuit and said baseband processor executing software modules are configured to reduce mismatches and phase deviations between the transceivers in a non-interrupting manner with a continuous operation of the system at the specified communication scheme.

2. The system according to claim 1, wherein said calibration circuit and said baseband processor executing software are configured to enable the common digital beamformer to generate calibration pilot signals injected to the inputs of the transceivers, via a digital-to-analog converter and an additional RF up-converter, and wherein the calibration circuit and said baseband processor are further configured to determine phase and amplitude differences between the plurality of transceivers' receivers, based on the digital output of said receivers across the bandwidth of the transceiver.

3. The system according to claim 2, wherein the calibration pilot comprises a narrowband signal.

4. The system according to claim 1, wherein said calibration circuitry and software modules are based on auxiliary hardware and auxiliary software, enabling the common digital beamformer entity to pick up its own downlink signal from each transmitting part of the said transceivers, via a calibration RF down-converter and an analog-to-digital converter, and further configured to determine phase and amplitude differences between the plurality of transceivers' transmitters, based on the digital output of said transmitters across the bandwidth of the transceiver, where said down-converter input is sequentially switched between each said transmitting part of the transceivers.

5. The system according to claim 1, wherein the specified communication scheme is Time-Domain-Duplex (TDD) exhibiting a time gap between transmit and receive.

6. The system according to claim 5, wherein the baseband processor is configured to avoid interruption of the operation of the system for calibration purposes, by using the transmit-receive time gap for switching the receivers array away from the antenna array, and connecting them to outputs of the calibration RF up-converter, and feeding the input of said up-converter with a calibration pilot signal generated by the common digital beamformer, for a partial part of said time gap, and further measuring the digitized output of the receivers array by the said common digital beamformer.

7. The system according to claim 5, wherein the baseband processor is further configured to avoid interruption of the operation of the system for calibration purposes by sequentially feeding the transmitting part of the transceivers via an RF splitter to the input of the calibration down-converter and measure the said down-converter digitized output during the time gap between transmit and receive.

8. The system according to claim 5, wherein said time gap between transmit and receive is divided up into several fields, so that the first field is left unused for guard time purposes, then the next field is used for receivers calibration, then the next one is used for calibration processing by the common digital beamformer, then the next one is used to apply phase adjustment to RF or digital parts of the system, and then the last field is not used to allow for guard time before switching back to active mode is taking place.

9. The system according to claim 5, wherein the down-link RF output of a given transceiver is fed into the calibration RF down-converter for a plurality of μsecs before the transmit timeslot is ending, and after transmission is turned off, the digital output of the said down-converter is being capture and processed by the common digital beamformer, and phase adjustment is subsequently applied.

10. The system according to claim 9, wherein selection of specific time period for wideband calibration is based on measurements of temperature fluctuation and current fluctuations at the power amplifiers array, and the setting of thresholds that will increase sampling rate per increased fluctuation magnitude.

11. The system according to claim 10, wherein the selection of specific time period for narrow band calibration addressing the LO phase alignment, is based on factory measurements that determine inter-transceiver phase uncertainty over time.

12. The system according to claim 1, wherein the system is implemented as a part of a base station or a subscriber unit.

13. A method comprising:
providing a plurality of transceivers connected to an antenna array and operatively associated each with a local oscillator (LO), wherein at least some of the transceivers do not share a common LO, and wherein at least some of the LOs are using a common reference oscillator;
digitally beamforming signals coming and going to the transceivers;
operating the transceivers at a specified communication scheme using a baseband processor; and
eliminating or reducing mismatches and phase deviations between the different transceivers using a calibration circuit and software modules executed on the baseband processor,
wherein said calibration circuit is incorporated in transceivers such that the elimination or reduction of mismatches and phase deviations is non-interrupting with a continuous operation of the transceivers at the specified communication scheme.

14. The method according to claim 13, wherein said calibration circuit and software modules are based on auxiliary hardware and auxiliary software, enabling the common digital beamformer to generate calibration pilot signals injected to the inputs of the receiving part of the transceivers, via a digital-to-analog converter and an additional RF up-converter, and further configured to determine phase and amplitude differences between the plurality of transceivers' receivers, based on the digital output of said receivers across the bandwidth of the transceiver.

15. The method according to claim 14, wherein the calibration pilot comprises a narrowband signal.

16. The method according to claim 13, wherein said calibration circuitry and software modules are based on auxiliary hardware and auxiliary software, enabling the common digital beamformer entity to pick up its own downlink signal from each transmitting part of the said transceivers, via a calibration RF down-converter and an analog-to-digital converter, and further configured to determine phase and amplitude differences between the plurality of transceivers' transmitters, based on the digital output of said transmitters across the bandwidth of the transceiver, where said down-converter input is sequentially switched between each said transmitting part of the transceivers.

17. The method according to claim 13, wherein the specified communication scheme is Time-Domain-Duplex (TDD) exhibiting a time gap between transmit and receive.

18. The method according to claim 17, wherein the baseband processor is further configured to avoid interruption of the operation of the system for calibration purposes, by using the transmit-receive time gap for switching the receivers array away from the antenna array, and connecting them to outputs of the calibration RF up-converter, and feeding the input of said up-converter with a calibration Pilot signal generated by the common digital beamformer, for a partial part of said time gap, and further measuring the digitized output of the receivers array by the said common digital beamformer.

19. The method according to claim 17, wherein the baseband processor is further configured to avoid interruption of the operation of the system for calibration purposes by sequentially feeding the transmitting part of the transceivers via an RF splitter to the input of the calibration down-converter and measure the said down-converter digitized output during the time gap between transmit and receive.

20. The method according to claim 17, wherein said time gap between transmit and receive is divided up into a plurality of fields, so that the first field is left unused for guard time purposes, the next field is used for receiver calibration, the next one is used for calibration processing by the common digital beamformer, the next one is used to apply phase adjustment to RF or digital parts of the system, and the last field is not used to allow for guard time before switching back to active mode takes place.

21. The method according to claim 17, wherein the downlink RF output of a given transceiver is fed into the calibration RF down-converter for a plurality of μsecs before the transmit timeslot is ending, and after transmission is turned off, the digital output of the said down-converter is captured and processed by the common digital beamformer, and phase adjustment is subsequently applied.

22. The method according to claim 21, wherein selection of specific time period for wideband calibration is based on measurements of temperature fluctuation and current fluctuations at the power amplifiers array, and the setting of thresholds that will increase sampling rate per increased fluctuation magnitude.

23. The method according to claim 21, wherein the selection of specific time period for narrow band calibration addressing the LO phase alignment is based on factory measurements that determine inter-transceiver phase uncertainty over time.

24. The method according to claim 13, wherein the method is implemented as a part of a base station or a subscriber unit.

* * * * *